United States Patent [19]

Fricke et al.

[11] Patent Number: 4,896,013
[45] Date of Patent: Jan. 23, 1990

[54] HYPERBOLOID CURRENT PICK-UP FOR AN ELECTRICAL DISCHARGE WIRE CUTTING MACHINE

[75] Inventors: William R. Fricke, Bloomingdale; Thomas J. Truty, Streamwood, both of Ill.

[73] Assignee: T-Star Industrial Electronics Corporation, Wheeling, Ill.

[21] Appl. No.: 178,560

[22] Filed: Apr. 7, 1988

[51] Int. Cl.$^4$ .......................... B23H 7/10; B23H 7/04
[52] U.S. Cl. ................................................. 219/69.12
[58] Field of Search .................... 219/69 W, 69.12; 204/206, 224 M

[56] References Cited

U.S. PATENT DOCUMENTS 4,539,459  9/1985  Yamagata ........................ 219/69 D
4,559,433  12/1985  Aramaki et al. ................. 219/69 W

FOREIGN PATENT DOCUMENTS 238233  11/1985  Japan ................................ 219/69 W
249531  12/1985  Japan ................................ 219/69 W
61-76216  4/1986  Japan ................................ 219/69 W
117015  6/1986  Japan ................................ 219/69 D Primary Examiner—A. D. Pellinen
Assistant Examiner—Geoffrey S. Evans
Attorney, Agent, or Firm—George Pappas

[57] ABSTRACT

An electrical discharge wire cutting machine includes a current pick-up for delivering current pulses from a power supply to an electrode wire. The current pick-up includes a central bore with a continuous curvilinear cross section. The current pick-up is mounted in a holder secured in a first open end of a cartridge barrel. A wire guide for guiding the passage of a wire electrode is mounted in a second open end of the cartridge barrel. A nozzle for directing de-ionized fluid around the wire electrode is secured on the second open end of the cartridge barrel adjacent the wire guide. The current pick-up holder includes a central bore offset from its longitudinal axis in a first direction. A wire pre-guide is mounted adjacent the current pick-up in an enlarged threaded bore of the current pick-up holder. The enlarged threaded bore is offset from the longitudinal axis of the pick-up holder in a second direction. The current pick-up includes a slot into which a tool may be inserted to rotate the current pick-up to expose different internal surfaces to the moving wire electrode.

8 Claims, 1 Drawing Sheet

HYPERBOLOID CURRENT PICK-UP FOR AN ELECTRICAL DISCHARGE WIRE CUTTING MACHINE

BACKGROUND OF THE INVENTION

A. Field of the Invention

The device of the present invention generally relates to a modification for an electrical discharge wire cutting machine; and more particularly, to a new and improved current pick-up for conducting current pulses from a power supply into a wire electrode of an electrical discharge wire cutting machine.

B. Description of the Prior Art

Electrical discharge wire cutting machines remove material from a workpiece by spark erosion as a wire electrode is fed from a spool or similar supply through the workpiece. During a cutting operation, it is necessary to deliver current to the moving wire electrode. To insure good electrical conduction between a power supply and a moving wire electrode, a current pick-up is used. Delivery of current pulses from a power supply to a wire electrode just above and below the cutting zone is provided by actual physical contact between the wire electrode and the current pick-up.

During a cutting operation, the wire electrode is moving at approximately 200 mm/min. across the inner peripheral surface of a central bore in the current pick-up. The inner peripheral surface of the current pick-up is worn by a combination of electrical and mechanical forces. To extend the useful life of the high wear current pick-up, it is typically constructed of an extremely hard and high wear material such as carbide. Despite its extreme hardness, carbide does wear and a wire electrode passing through the carbide current pick-up ultimately erodes a slot in the central bore or wire opening of the current pick-up to a sufficient extent that electrical conduction between the carbide current pick-up and the wire electrode is detrimentally affected.

The erosion of the central bore of the current pick-up enlarges the bore making it possible for the wire electrode to be centered temporarily in the bore out of contact with the current pick-up. When this occurs, there is no electrical contact between the wire electrode and the carbide current pick-up. To prevent the wire electrode from moving out of contact with the pick-up, guides for guiding the wire electrode through the bore of the carbide current pick-up are used. The center lines of these guides are offset relative to the centerline of the bore of the carbide current pick-up causing the wire electrode to bear against the inner surface of the bore of the current pick-up.

It is believed that although delivery of current is improved by the offsetting of the axis of the guides relative to the central bore of the current pick-up, the wire electrode is slightly deformed as a result of this displacement. This deformation is caused, at least in part, by rubbing of the wire electrode over an edge where a tapered inlet and outlet merge with the bore. The deformation of the wire electrode is believed to be caused by work hardening of one side of the wire electrode surface due to engagement between the wire electrode and the inner peripheral surface of the longitudinal bore of the current pick-up and the edges in the bore. This deformation can affect the cutting accuracy of the electrical discharge wire cutting machine since deformation of the wire electrode results in a "bowing" of the wire electrode in the cutting region. This "bowing" produces a slight offset from the desired cutting path with a corresponding reduction in wire cutting accuracy.

SUMMARY OF THE INVENTION

An object of the present invention is to provide a new and improved current pick-up assembly for an electrical discharge wire cutting machine.

Another object of the present invention is to provide a new and improved current pick-up for use with an electrical discharge wire cutting machine.

A further object of the present invention is to provide a new and improved current pick-up for an electrical discharge wire cutting machine that may be rotated without moving a wire guide in the machine to expose different surfaces for engagement with a wire electrode thereby increasing the life of the current pick-up.

Briefly, the present invention is directed to a new and improved device, commonly referred to as a current pick-up, for delivering current pulses from a current supply to a wire electrode of an electrical discharge wire cutting machine. The current pick-up is mounted in a cartridge assembly. Typically, an electrical discharge wire cutting machine includes an upper assembly and a lower assembly for delivering a current to a wire electrode, guiding the wire electrode through a workpiece, and forming a column of de-ionized fluid about the wire electrode. For the purposes of the present invention, only a lower assembly, and specifically, a lower cartridge assembly, is described.

The cartridge assembly of the present invention includes a cartridge barrel defining a housing for the assembly. The cartridge barrel has a first open end and a second open end. A wire guide is mounted in the first open end of the cartridge barrel and functions to guide the wire electrode of an electrical discharge wire cutting machine. A nozzle is secured over the first open end of the cartridge barrel adjacent the wire guide for directing de-ionized fluid around the wire electrode for cooling the wire electrode and workpiece and to flush the cutting area.

A current pick-up holder is mounted in the second open end of the cartridge barrel and functions to hold a current pick-up. A current pick-up mounted in the holder includes a longitudinal bore with first and second ends. The inner peripheral surface of the longitudinal bore is defined by a continuous, curvilinear, longitudinal cross-section that in a preferred embodiment is a hyperboloid.

The wire guide secured in the first open end of the cartridge barrel includes a central bore coaxial with the bore of the cartridge barrel. The current pick-up holder also includes a central bore. The central bore of the holder is offset from its longitudinal axis and eccentric in a first direction to the longitudinal axis of the wire guide. The eccentricity of the bore of the current pick-up holder offsets the bore of the current pick-up relative to the bore of the wire guide.

A diamond pre-guide is mounted in a lower threaded open end of the pick-up holder adjacent the current pick-up for guiding a wire electrode into the bore in the current pick-up. The lower threaded open end of the pick-up holder is eccentric in a second direction opposite the first direction of eccentricity of the central bore of the pick-up holder. These opposite eccentricities of the pick-up holder bore and the bore of the pre-guide position the wire electrode against the inner peripheral surface of the current pick-up to ensure uninterrupted transfer of current pulses to the wire electrode. Due to the hyperbolic shape of the inner peripheral surface of the longitudinal bore of the current pick-up, the wire electrode does not forceably engage or bend over the edges in the bore defined by conical ends in the bore and there is less deformation of the wire electrode than exists in the prior art.

The current pick-up also includes a slot or opening in one end into which a tool may be inserted to rotate or turn the current pick-up to expose different portions of the inner surface of the carbide pick-up bore to the wire electrode. By rotating the current pick-up, a new, unworn surface is moved into engagement with the wire electrode when a portion of the inner surface of the bore exposed to the wire electrode has been worn. This slot or opening in the current pick-up allows the current pick-up to be rotated without moving the wire guide which could result in misalignment.

BRIEF DESCRIPTION OF THE DRAWINGS

The above and other objects and advantages and novel features of the present invention will become apparent from the following detailed description of preferred embodiments of the invention illustrated in the accompanying drawings wherein.

Figure 1:
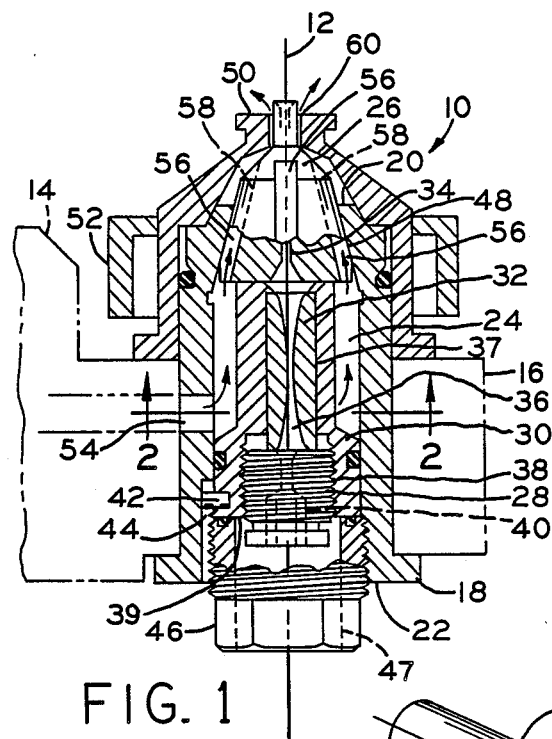
FIG. 1 is a vertical cross sectional view of a cartridge assembly including a current pick-up constructed in accordance with the principles of the present invention.
Figure 2:
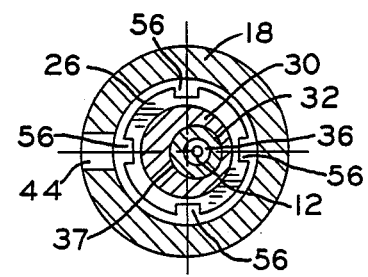
FIG. 2 is a view taken generally along line 2—2 in FIG. 1.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring initially to FIG. 1, a cartridge assembly generally designated by the referenced numeral 10 is illustrated. The cartridge assembly 10 is used in an electrical discharge wire cutting machine to guide a wire electrode 12 to a workpiece, to deliver an electrical current to the wire electrode 12, and to form a column of de-ionized fluid around the wire electrode 12. The cartridge assembly 10 is a lower cartridge assembly fixed to an electrical discharge wire cutting machine by a lower cartridge holding fixture 14 and a lower clamp 16. The lower cartridge holding fixture 14 and lower clamp 16 hold the lower cartridge assembly 10 in a fixed position below a workpiece. It will be understood by those skilled in the art that an upper cartridge assembly similar to lower cartridge assembly 10 is also clamped on an electrical discharge wire cutting machine above the workpiece. In operation, the wire electrode 12 passes through the lower cartridge assembly 10, through a workpiece, and into an upper cartridge assembly.

The cartridge assembly 10 includes a cartridge barrel 18 that serves as a housing for the components of the cartridge assembly 10. The cartridge barrel 18 is cylindrical in configuration with an upper open end 20 and a lower open end 22. The cartridge barrel 18 includes a central longitudinal bore 24 defining a chamber through which the wire electrode 12 passes.

To guide the wire electrode 12 a wire guide 26 is mounted in the first or upper open end 20 of the cartridge barrel 18. A pre-guide 28 also for guiding the wire electrode 12 is threaded into an enlarged, eccentric bore 38 of a pick-up holder 30 and positioned adjacent a lower, open end 39 of the pick-up holder 30. The pick-up holder 30 also includes a longitudinal central bore 37. The diameter of the bore 37 is substantially identical to the outer diameter of a current pick-up 32 allowing the current pick-up 32 to be slideably positioned in the bore 37.

The current pick-up 32 is held by the pick-up holder 30 in the central bore 24 of the cartridge barrel 18 between the pre-guide 28 and the wire guide 26. The current pick-up 32 is electrically connected to a source of electrical current and is intended to deliver a current or charge to the wire electrode 12. In order to deliver current to the wire electrode 12, the wire electrode 12 must engage the inner peripheral surface of a central bore 36 of the current pick-up 32 as the wire electrode 12 moves through the cartridge assembly 10. To ensure the desired contact of the wire electrode 12 with the inner peripheral surface of the current pick-up bore 36, the wire guide 26 includes a central bore 34 that is coaxial with the longitudinal, central bore 24 of the cartridge barrel 18. The bore 36 of the current pick-up 32 is coaxial with the longitudinal axis of the current pick-up 32. The central bore 37 of the pick-up holder 30 is eccentric and is offset in a first direction from its longitudinal axis. The enlarged bore 38 is also eccentric and is offset in a second direction different from the first direction from the longitudinal axis of the pick-up holder 30. This opposite eccentricity of the bores 37 and 38 positions the moving wire electrode 12 to engage the inner peripheral surface of the central bore 36 of the current pick-up 32.

To insure correct alignment of the central bore 37 of the pick-up holder 30 and the central bore 34 of wire guide 26, the current pick-up holder 30 includes a key 42 that fits into a key-way 44 formed in the cartridge barrel 18. The key 42 and key-way 44 coact to ensure alignment of the current pick-up holder 30 and the wire guide 26.

Once the components of the cartridge assembly 10 are assembled they are retained in position by a retainer nut 46 threadably mounted in the lower open end 22 of the cartridge barrel 18. The retainer nut 46 exerts a force in the longitudinal direction to force the wire guide 26 into a tapered upper portion 48 of the cartridge barrel 18 fixing the components of the cartridge assembly 10 against relative movement. The retainer nut 46 includes an axial passage or opening 47 allowing access to the current pick-up 32 without the need to move the retainer nut 46 or any of the components in the cartridge assembly 10 other than the pre-guide 28.

During operation of an electrical discharge wire cutting machine, it is necessary to cool the wire electrode 12 and to flush the cutting area of the wire electrode 12 and a workpiece. These functions are accomplished by de-ionized fluid formed in a column around the wire electrode 12 as it leaves the cartridge assembly 10. To form a column of de-ionized fluid around the wire electrode 12 a nozzle 50 is secured adjacent the upper open end 20 of the cartridge barrel 18 by a nozzle retainer 52. The cartridge barrel 18 includes an opening 54 for communicating pressurized de-ionized fluid to the central bore or chamber 24 of the cartridge barrel 18. Pressurized de-ionized fluid flows from the chamber 24 through passages or notches 56 defined in the wire guide 26. The fluid exits the wire guide 26 through a series of four equally spaced slots 58. The de-ionized fluid then flows out a nozzle opening 60 which directs the de-ionized fluid in a column about the wire electrode 12.

Figures 3, 4:
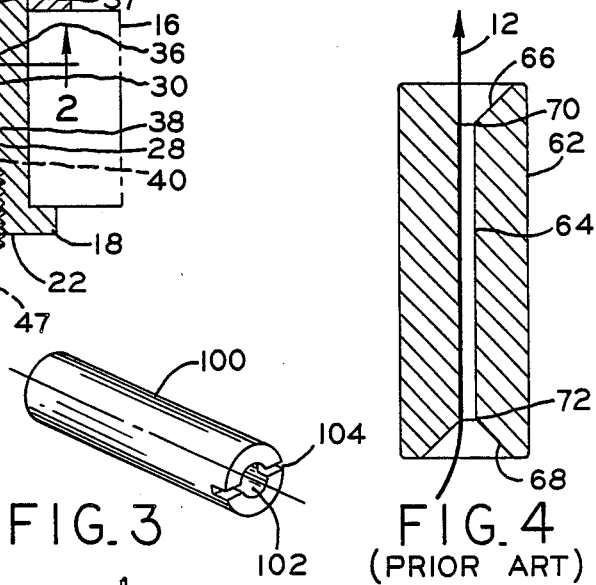
FIG. 3 is a perspective view of a current pick-up of the present invention.
FIG. 4 is an enlarged vertical cross sectional view of a prior art current pick-up.

Prior current pick-ups in electrical discharge wire cutting machines correspond to the current pick-up 62 illustrated in FIG. 4. The current pick-up 62 is of a generally cylindrical configuration with a straight, central, longitudinal bore 64 extending coaxially with its longitudinal axis. The bore 64 is tapered or conical at its upper end 66 and its lower end 68. The tapered ends 66 and 68 allow the operator of an electrical discharge wire cutting machine to thread the wire electrode 12 more easily through the current pick-up 62. The tapered or conical upper end or bore 66 and the tapered or conical lower end or bore 68 define sharp edges or junctures 70 and 72, respectively. As the wire electrode 12 passes through the bore 64 of the current pick-up 62, it bears against the lower sharp edge 72 which can deform the wire electrode 12. This deformation of the wire electrode 12 can decrease the cutting accuracy of the electrical discharge wire cutting machine since deformation can result in a bowing of the wire electrode 12 in the cutting region of the workpiece. This bowing produces a slight offset from the desired cutting path and a corresponding reduction in cutting accuracy. The wire deformation is believed to be caused by hardening of one side of the wire electrode 12.

Figure 5:
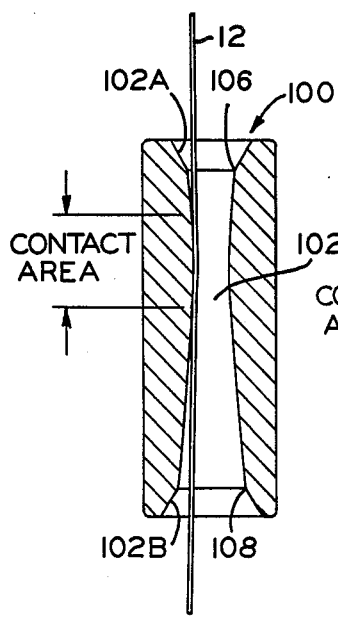
FIG. 5 is an enlarged vertical cross sectional view of a first embodiment of a current pick-up constructed in accordance with the principles of the present invention.

A current pick-up 100 (FIG. 5) constructed in accordance with the principles of the present invention reduces the problem of wire electrode deformation. The current pick-up 100 includes a longitudinal central bore 102 with an upper conical end 102A and a lower conical end 102B. The upper conical end 102A and lower conical end 102B allow easier threading of the wire electrode 12 and define edges 106 and 108, respectively. The longitudinal cross sectional configuration of the inner peripheral surface of the bore 102 between the edge 106 and the edge 108 is continuous and curvilinear. The curvilinear configuration bulges toward the center of the bore 102. This bulge moves the wire electrode 12 away from the edges 106 and 108 reducing the hardening of one side of the wire electrode experienced in the prior art current pick-up 62. The actual contact area of the wire electrode 12 and the inner peripheral surface of the bore 102 is indicated in FIG. 5. Increased accuracy in cutting by an electrical discharge wire cutting machine was experienced by using a current pick-up with the continuous curvilinear longitudinal cross sectional configuration of the bore 102.

Figure 6:
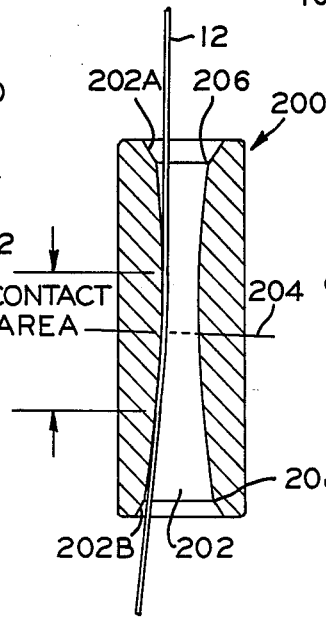
FIG. 6 is an enlarged vertical cross sectional view of a second embodiment of a current pick-up constructed in accordance with the principles of the present invention.

A second embodiment of an improved current pick-up 200 is illustrated in FIG. 6. The current pick-up 200 includes a longitudinal central bore 202 with an upper conical end 202A and a lower conical end 202B defining edges 206 and 208, respectively. The longitudinal cross sectional configuration of the inner peripheral surface of the bore 202 is similar to the cross sectional configuration of bore 102 in that it is a continuous, curvilinear surface between the edges 206 and 208. The cross sectional configuration of the inner peripheral surface of the bore 202, however, is a hyperboloid with the center line 204 of the hyperboloid coinciding with the midline of the current pick-up 200. The wire electrode 12 bears against the hyperbolic inner peripheral surface of bore 202 at approximately the center line 204 of the hyperboloid and does not engage the sharp edges 206 and 208 due to the hyperbolic shape. The area of contact between the wire electrode 12 and the inner peripheral surface of bore 202 is indicated in FIG. 6. By minimizing the engagement of the wire electrode 12 with the edges 206 and 208, deformation of the wire electrode 12 is minimized and the cutting accuracy of an electric discharge wire cutting machine using the current pick-up 200 is increased.

Figure 7:
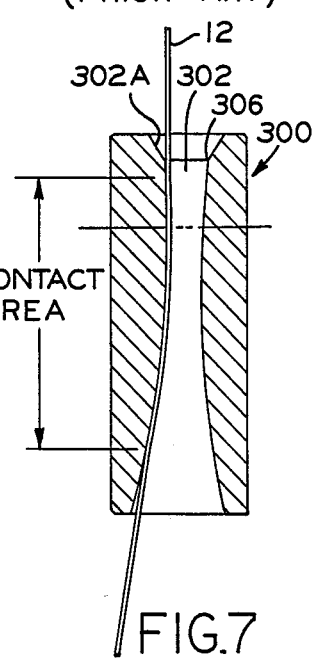
FIG. 7 is an enlarged vertical cross sectional view of a third embodiment of the current pick-up of the present invention.

A third embodiment of the present invention is current pick-up 300 illustrated in FIG. 7. The current pick-up 300 is similar to the current pick-up 200 in that it includes a longitudinal central bore 302 with an upper conical end 302A defining an edge 306. The bore 302 is of a continuous curvilinear hyperboloid longitudinal cross section configuration as it extends from edge 306. The center line 304 of the hyperboloid is, however, offset from the midline of the current pick-up 300. In the embodiment illustrated in FIG. 7, the center line 304 is above the midline of the current pick-up 300 near the outlet of the current pick-up 300. It is also possible to have the center line 304 of the inner peripheral surface of the bore 302 below the midline of the current pick-up 300. The area of contact between the wire electrode 12 and the inner peripheral surface of bore 302 is indicated in FIG. 7. Although the wire electrode 12 is adjacent or against the edge 306 in current pick-up 300, the hyperbolic configuration substantially reduces the force with which the wire electrode 12 bears against the edge 306 thereby minimizing any hardening of the wire electrode 12.

In any of the embodiments of the current pick-up 100, 200, and 300 the wire electrode 12 is moved away from any sharp edges over which the wire electrode 12 passes, thus minimizing deformation of the wire electrode 12 and increasing the cutting accuracy of an electrical discharge wire cutting machine including the current pick-up 100, 200 or 300.

Since the wire electrode 12 engages a portion of the inner peripheral surface of the bore 102, 202 or 302 of the current pick-up 100, 200, or 300, wearing does occur along that surface. To minimize wear, the current pick-up 100, 200, or 300 is fabricated of carbide; however, wearing does occur. To prolong the life of any of the current pick-ups 100, 200, or 300 of the present invention, each current pick-up (the current pick-up 100, for example,) includes a slot 104 in the end of the current pick-up 100 adjacent the retainer nut 46 (FIG. 3). The slot 104 can be of any type of configuration to accommodate a tool. In the embodiment illustrated in FIG. 3, the slot 104 will accommodate the straight blade of a screw driver. The slot 104 allows the current pick-up 100 to be rotated in the pick-up holder 30 to expose a different portion of the inner peripheral surface of bore 102 to the wire electrode 12. Since the alignment of the components in the cartridge assembly 10 is critical, it is desirable to rotate the pick-up 100 without moving the remaining components. The opening 47 in the retainer nut 46 allows access to the pre-guide 28. The pre-guide 28 may be threaded out of the lower end 39 of the pick-up holder 30 by a tool exposing the slot 104 in the current pick-up 100. A tool can be positioned in the slot 104 and the current pick-up 100 rotated to expose another portion of the inner peripheral surface of the current pick-up 100 to the moving wire electrode 12. Thereafter, the pre-guide 28 can be threaded into the bore 38 and operation of the electrical discharge wire cutting machine commenced. This feature allows the current pick-up 100 to be used several times before it must be replaced, and to rotate the pick-up 100 without misaligning the other components in the cartridge assembly 10.

The current pick-up 100, 200 or 300 of the present invention increases the accuracy of an electrical discharge wire cutting machine in which the current pick-up is included. In addition, the current pick-up 100, 200 or 300 of the present invention can be turned to expose a new inner peripheral surface to the wire electrode 12 wire guide 26 in the cartridge assembly 10.

What is claimed and sought to be secured by Letters Patent of the United States is:

1. A cartridge assembly for an electrical discharge wire cutting machine, comprising:
   a cartridge barrel defining a housing for said cartridge assembly; said cartridge barrel having a first open end and a second open end;
   a wire guide mounted in said first open end of said cartridge barrel for guiding a wire electrode of an electrical discharge wire cutting machine;
   a current pick-up holder mounted in said second open end of said cartridge barrel;
   a current pick-up for delivering current to said wire electrode, said current pick-up mounted in said pick-up holder, said current pick-up including a longitudinal bore with a first end and a second end, said bore being of a continuous, curvilinear cross-section sufficient to minimize the engagement of said wire electrode with said first end and said second end of said bore; and
   wherein said cross section of said bore of said current pick-up is a hyperboloid with a center line offset from a longitudinal midline of said current pick-up.

2. A cartridge assembly for an electrical discharge wire cutting machine, comprising:
   a cartridge barrel defining a housing for said cartridge assembly; said cartridge barrel having a first open end and a second open end;
   a wire guide mounted in said first open end of said cartridge barrel for guiding a wire electrode of an electrical discharge wire cutting machine;
   a current pick-up holder mounted in said second open end of said cartridge barrel;
   a current pick-up for delivering current to said wire electrode, said current pick-up mounted in said pick-up holder, said current pick-up including a longitudinal bore with a first end and a second end, said bore being of a continuous, curvilinear cross-section sufficient to minimize the engagement of said wire electrode with said first end and said second end of said bore; and,
   a preguide mounted in an enlarged bore in said current pick-up holder adjacent said current pick-up for guiding said wire electrode into said current pick-up, said enlarged bore including a longitudinal axis offset in a first direction from the central longitudinal axis of said pick-up holder, said current pick-up holder including a central bore offset from its longitudinal axis in a second direction different from said first direction, thereby providing an offset that positions said wire electrode against the inner peripheral surface of said bore of said current pick-up.

3. A cartridge assembly for an electrical discharge wire cutting machine, comprising:
   a cartridge barrel defining a housing for said cartridge assembly; said cartridge barrel having a first open end and a second open end;
   a wire guide mounted in said first open end of said cartridge barrel for guiding a wire electrode of an electrical discharge wire cutting machine;
   a current pick-up holder mounted in said second open end of said cartridge barrel;
   a current pick-up for delivering current to said wire electrode, said current pick-up mounted in said pick-up holder, said current pick-up including a longitudinal bore with a first end and a second end, said bore being of a continuous, curvilinear cross-section sufficient to minimize the engagement of said wire electrode with said first end and said second end of said bore; and,
   wherein said current pick-up includes a first end and a second end, a tool engagement portion in either said first end or said second end of said current pick-up for engagement of a tool to rotate said current pick-up relative to said current pick-up holder.

4. In an electrical discharge wire cutting machine including a wire electrode for removing material from a workpiece by spark erosion, a source of electrical current wherein current from said source of electrical current is delivered to said wire electrode, a source of de-ionizing fluid, a cartridge assembly for delivering current to said wire electrode and directing a column of de-ionized fluid around said wire electrode, and a cartridge holding fixture for holding said cartridge assembly, the improvement comprising:
   a current pick-up mounted in said cartridge assembly for delivering current from said source of electrical current to said wire electrode, said current pick-up including a longitudinal bore through which said wire electrode passes; said longitudinal bore having a continuous, uninterrupted, curvilinear longitudinal cross section between first and second edges in said longitudinal bore; and,
   wherein said longitudinal cross section of said bore of said current pick-up is a hyperboloid with a center line offset from the longitudinal mid-line of said current pick-up.

5. In an electrical discharge wire cutting machine including a wire electrode for removing material from a workpiece by spark erosion, a source of electrical current wherein current from said source of electrical current is delivered to said wire electrode, a source of de-ionizing fluid, a cartridge assembly for delivering current to said wire electrode and directing a column of de-ionized fluid around said wire electrode, and a cartridge holding fixture for holding said cartridge assembly, the improvement comprising:

a current pick-up mounted in said cartridge assembly for delivering current from said source of electrical current to said wire electrode, said current pick-up including a longitudinal bore through which said wire electrode passes; said longitudinal bore having a continuous, uninterrupted, curvilinear longitudinal cross section between first and second edges in said longitudinal bore; and, wherein said current pick-up includes a first end, a tool engagement element in said first end for engaging a tool to rotate said current pick-up to engage said wire electrode with a different inner peripheral portion of said bore of current pick-up.

6. In an electrical discharge wire cutting machine including a wire electrode for removing material from a workpiece by spark erosion, a source of electrical current wherein current from said source of electrical current is delivered to said wire electrode, a source of de-ionizing fluid, a cartridge assembly for delivering current to said wire electrode and directing a column of de-ionized fluid around said wire electrode, and a cartridge holding fixture for holding said cartridge assembly, the improvement comprising:

a current pick-up mounted in said cartridge assembly for delivering current from said source of electrical current to said wire electrode, said current pick-up including a longitudinal bore through which said wire electrode passes; said longitudinal bore having a continuous, uninterrupted, curvilinear longitudinal cross section between first and second edges in said longitudinal bore; and, a holder for holding said current pick-up, said holder including a central bore offset from its longitudinal axis in a first direction, and a pre-guide mounted in an enlarged bore in said holder adjacent said current pick-up for guiding said wire electrode into said bore of said current pick-up, said enlarged bore offset in a second direction from said longitudinal axis.

7. A current pick-up for an electrical discharge wire cutting machine for delivering a current to a wire electrode; comprising:

a cylindrical body including a first end and a second end, a longitudinal bore in said cylindrical body extending from said first end to said second end of said body for the passage of a wire electrode, said longitudinal bore including an uninterrupted, curvilinear inner peripheral surface extending from said first end to said second end against at least a portion of which said wire electrode bears while passing through said bore; and, wherein said inner peripheral surface is a hyperboloid with a center line offset from the longitudinal midline of said cylindrical body.

8. A current pick-up for an electrical discharge wire cutting machine for delivering a current to a wire electrode; comprising:

a cylindrical body including a first end and a second end, a longitudinal bore in said cylindrical body extending from said first end to said second end of said body for the passage of a wire electrode, said longitudinal bore including an uninterrupted, curvilinear inner peripheral surface extending from said first end to said second end against at least a portion of which said wire electrode bears while passing through said bore; and, a slot in said first end of said cylindrical body for engagement with a tool for rotating said cylindrical body to expose different portions of said inner peripheral surface to said wire electrode.

* * * * *